(12) United States Patent
Harris et al.

(10) Patent No.: US 7,605,346 B2
(45) Date of Patent: Oct. 20, 2009

(54) POWDER DELIVERY NOZZLE

(75) Inventors: James Gordon Harris, Mooroolbark (AU); Milan Brandt, Templestowe (AU)

(73) Assignee: Hardwear Pyt Ltd, New South Wales (AU)

( * ) Notice: Subject to any disclaimer, the term of this patent is extended or adjusted under 35 U.S.C. 154(b) by 388 days.

(21) Appl. No.: 11/632,057

(22) PCT Filed: Aug. 23, 2006

(86) PCT No.: PCT/AU2006/001205

§ 371 (c)(1),
(2), (4) Date: Jan. 10, 2007

(87) PCT Pub. No.: WO2007/022567

PCT Pub. Date: Mar. 1, 2007

(65) Prior Publication Data

US 2008/0308538 A1 Dec. 18, 2008

(30) Foreign Application Priority Data

Aug. 23, 2005 (AU) .............................. 2005904580

(51) Int. Cl.
*B23K 26/14* (2006.01)
*B23K 26/34* (2006.01)
(52) U.S. Cl. .............................. 219/121.84; 219/121.63
(58) Field of Classification Search ............ 219/121.84, 219/121.63
See application file for complete search history.

(56) References Cited

U.S. PATENT DOCUMENTS

| | | | |
|---|---|---|---|
| 4,672,171 A | 6/1987 | Cusimano et al. | |
| 4,724,299 A | 2/1988 | Hammeke | |
| 5,043,548 A | 8/1991 | Whitney et al. | |
| 5,321,228 A | 6/1994 | Krause et al. | |
| 5,418,350 A | 5/1995 | Freneaux et al. | |
| 5,420,391 A | 5/1995 | Delcea | |
| 5,477,026 A * | 12/1995 | Buongiorno | 219/121.84 |
| 5,556,560 A | 9/1996 | Ahola et al. | |
| 5,961,862 A * | 10/1999 | Lewis et al. | 219/121.84 |
| 6,137,078 A | 10/2000 | Keller | |
| 6,263,918 B1 | 7/2001 | Lewis et al. | |

(Continued)

FOREIGN PATENT DOCUMENTS

DE 10248459 A1 5/2004

(Continued)

*Primary Examiner*—Geoffrey S Evans
(74) *Attorney, Agent, or Firm*—Jacobson Holman PLLC

(57) ABSTRACT

A powder delivery nozzle (32), for a laser cladding delivery head (38), includes inner and outer sleeves (52, 54). The inner sleeve (52) defines a central passage enabling a laser beam to pass along the nozzle axis. The sleeves (52, 54) define a multi-branched longitudinally extending powder flow-path system (52, 57, 58, 59, 60, 62). The system (52, 57, 58, 59, 60, 62) includes a first set of passages (59), and a second set of passages (60), with the passages (59) of the first set angularly offset from the passages (60) of the second set. Each passage (59) of the first set communicates with two passages (60) of the second set by a circumferential passage or gallery (58) such that powder from each passage (59) of the first set passes through to two passages (60) of the second set. The same form of communication is able to apply to any other set.

17 Claims, 5 Drawing Sheets

U.S. PATENT DOCUMENTS

| | | |
|---|---|---|
| 6,316,744 B1 | 11/2001 | Nowotny et al. |
| 6,534,745 B1 | 3/2003 | Lowney |
| 6,696,664 B2 | 2/2004 | Pyritz et al. |
| 6,774,338 B2 | 8/2004 | Baker et al. |
| 2005/0056628 A1* | 3/2005 | Hu ........................ 219/121.84 |
| 2006/0266740 A1* | 11/2006 | Sato et al. .............. 219/121.84 |

FOREIGN PATENT DOCUMENTS

| | | |
|---|---|---|
| DE | 102204034777 | 3/2006 |
| JP | 4-274882 | 9/1992 |
| JP | 2005-219060 A * | 8/2005 |
| WO | WO97/21515 | 6/1997 |
| WO | WO02/43454 | 5/2002 |
| WO | WO2005/084875 | 9/2005 |

\* cited by examiner

POWDER DELIVERY NOZZLE

This is a national stage of PCT/AU06/001205 filed Aug. 23, 2006 and published in English.

FIELD OF THE INVENTION

This invention relates to a powder delivery nozzle for a laser delivery head used for laser cladding.

BACKGROUND ART

In a laser cladding process, a laser beam melts a powder and also the surface of a substrate, and the two molten materials combine to form a coating upon solidifying. The coatings can have improved wear and corrosion resistance compared to the substrate, or the process can be used to rebuild worn or eroded surfaces using powder of the same material as the substrate.

With known powder delivery arrangements, the efficiency of laser cladding can vary substantially with the orientation of the laser delivery head and, hence, the direction in which the laser beam is delivered. When the delivery head is oriented other than in the down vertical direction for laser delivery, an uneven distribution of powder usually occurs. This is due to the influence of gravity, which is evident from there being more powder distributed to the lower side of the laser delivery head.

The present invention seeks to provide an improved powder delivery nozzle for a laser cladding laser delivery head, and a laser delivery head having the improved nozzle, which enables greater freedom to operate more efficiently in orientations other than the down vertical direction.

SUMMARY OF THE INVENTION

According to the present invention, there is provided a powder delivery nozzle for a laser cladding delivery head, wherein the nozzle includes an inner sleeve disposed within an outer sleeve and having an outer surface in contact with an inner surface of the outer sleeve; wherein the inner sleeve defines a central passage which extends from a first end to a second end of the nozzle and which enables a laser beam to pass along an axis through the nozzle, from the first end; the sleeves, along their contacting surfaces, co-operate to define a flow-path system along which fine metal alloy powder is able to pass for discharge at the second end of the nozzle; the nozzle, at a location remote from the second end, has an inlet through which the fine powder entrained in a carrier gas is able to be supplied to the flow-path system for flow to, and discharge at, the second end of the nozzle; the flow-path system has a multi-branched longitudinally extending arrangement of passages extending from the inlet to a plurality of outlets spaced around the central passage at or adjacent to the second end of the nozzle; and wherein the arrangement of passages includes a first set of passages each of which extends longitudinally from the inlet towards the second end of the nozzle and a second set of passages each of which extends longitudinally from the first set towards the second end of the nozzle, with the passages of the first set angularly offset from the passages of the second set and each passage of the first set in communication with two passages of the second set by a circumferentially extending passage or gallery such that powder flow from each passage of the first set is able to pass through to two passages of the second set.

Each passage of the second set may extend to a respective one of the plurality of outlets of the nozzle. Alternatively, there may be a third set of passages which extend from the second set towards the second end of the nozzle with each passage of the second set in communication with two passages of the third set by a circumferentially extending passage or gallery. Each passage of the third set may extend to a respective outlet, or there similarly can be at least a fourth set of passages, although this usually is not necessary. In each case, the plurality of outlets most preferably are substantially uniformly distributed around the axis through the nozzle. Also, the passages of the last set extending to the outlets are similarly substantially uniformly distributed around that axis. A similar distribution preferably applies to the passages of each set, but with the passages of each set angularly offset from the passages of the next set.

Between the passages of one set and the passages of the next set, there preferably is a circumferentially continuous gallery which provides communication between each passage of the one set and two passages of the next set. However, a circumferentially discontinuous series of galleries may be provided, with each passage of the one set in communication with two passages of the next set via a respective gallery of the series.

Preferably the powder flow from each passage of the first set passes through the gallery to a respective pair of passages of the second set. Thus, in that arrangement, the second set will comprise twice the number of passages as there are in the first set. This increase by a factor of two preferably occurs at each gallery where there is more than one gallery. There are other possible arrangements, although they are less preferred.

Each passage of each set of passages preferably extends substantially parallel to a respective plane containing the axis of the nozzle. The gallery or each gallery preferably extends substantially parallel to a plane perpendicular to the axis of the nozzle.

The nozzle is adapted at its first end for connection to a laser delivery head from which a laser beam is able to pass along the central passage. The nozzle may be adapted for the supply of shielding gas, preferably argon, for flow along the central passage. Also, the nozzle may be adapted for cooling by a flow of cooling water.

In one preferred arrangement, the nozzle comprises one part of a nozzle assembly, with the nozzle assembly further including a tubular main body. In that arrangement, the nozzle is releasably connectable to one end of the main body to form the assembly, with the main body at its other end being releasably connectable to the laser delivery head. Thus, a laser beam from the delivery head is able to pass through the central passage of the main body and then through the nozzle. Most conveniently the main body defines a water jacket through which cooling water is able to flow for cooling the nozzle. Also, the main body may have a connector for receiving shielding gas from a source of supply, with the connector communicating with the central passage of the main body. Thus, the shield gas is able to flow along the central passage of the main body before flowing through the central passage of the nozzle. Additionally, the nozzle assembly may be adapted for providing a flow of shielding gas over the outer surface of the nozzle, such as between the nozzle and an outermost sleeve or casing, to form a curtain of the gas around a powder stream issuing from the nozzle.

Where the nozzle is connectable to a laser delivery head by means of a main body of a nozzle assembly, the main body may have a connector for receiving, from a source of supply, fine cladding powder entrained in a carrier gas. Thus, the inlet of the nozzle may receive the fine powder from the main body.

The form of the passages and the respective flow path length from the inlet to each outlet most preferably are such that the powder mass flow rate and the powder flow velocity are substantially the same for each outlet. The mass flow rate and flow velocity preferably are the same for each outlet as a consequence of that form and path length being substantially the same.

The number of outlets and, hence, the complexity of the arrangement of passages can vary considerably. The size of the nozzle is one factor contributing to this. However, a further factor is the desirability that the nozzle is able to generate streams of powder which, from the outlets of the nozzle, merge circumferentially with each other in extending beyond the second end of the nozzle.

The inlet through which powder is able to be supplied to the flow-path system may communicate directly with an inlet end of a passage of the multi-branched arrangement or, via a connecting passage, directly with the inlet end of a plurality of passages of the arrangement. Alternatively, the inlet may communicate with at least one passage of the multi-branched arrangement via a chamber therebetween. In each case, there may be more than one inlet through which powder is able to be supplied to the flow path system.

At least with small nozzle sizes, the nozzle has at least three, preferably at least four, outlets. There more preferably are at least six outlets. Particularly with larger nozzle sizes, there can be up to thirty-two or more outlets.

The provision of a circumferentially extending gallery by which the powder flow from a passage of one set is able to pass to further passages of a next set is found to be highly desirable. Usually it is more practical for a gallery to pass the flow from a passage of one set only to two passages of a next set. However, it is possible to have the flow from the passage of the one set pass to three or more passages of the next set.

The outer surface of the inner sleeve and the inner surface of the outer sleeve may taper to the second end of the nozzle, over at least part of the axial extent of those surfaces ending at the second end. Also, those surfaces may be circular in cross-sections normal to the axis. In one convenient arrangement, those surfaces are cylindrical over a first part of their axial extent from adjacent to the first end of the nozzle and thereafter taper frustoconically to the second end of the nozzle. In each case, the outer surface of the outer sleeve may follow the overall form of the inner surface of that sleeve. However, where the inner surface tapers to the second end of the nozzle, a taper for the outer surface preferably is at a larger included angle such that the outer sleeve reduces in wall thickness to the second end over the axial extent of the tapering.

The flow-path system may be wholly defined in the outer surface of the inner sleeve or in the inner surface of the outer sleeve, or partly in each of those surfaces. Thus each passage, and each circumferentially extending gallery, may be wholly defined in the outer surface of the inner sleeve or in the inner surface of the outer sleeve, or partly in each of those surfaces, while respective passages and galleries may be in each surface. However, as a practical matter, the passages and galleries can more readily be formed, such as by machining, in the outer surface of the inner sleeve.

Where the inner and outer surfaces are circumferentially curved, such as to be of circular cross-sections, the circumferentially extending galleries will extend arcuately. A gallery may extend in the form of an arc, such as to enable a respective passage to extend from each of its ends. However, in another useful arrangement, an arcuately extending gallery can extend around a full circumference of those surfaces. Thus, where the surfaces are circular in cross-sections, the gallery is of toroidal form.

The arrangement of passages preferably has more than two sets of passages. Also, there preferably are at least six outlets, such as from eight to sixteen outlets, from the nozzle. The final set of passages, that is the set having passages ending at the outlets, will have a number of passages corresponding to the number of outlets.

In each form of the nozzle, the central passage defined by the inner sleeve, enabling the passage of a laser beam, preferably has a known form for that purpose. Thus, while the central passage may be a uniform circular cross-section along an initial part of its length from the first end of the nozzle, the central passage thereafter preferably tapers frustoconically to the second end of the nozzle. Where the outer surface of the inner sleeve and the inner surface of the outer sleeve taper to the second end of the nozzle, this preferably is at a larger included angle than for the central passage, or at substantially the same included angle as the central passage.

With use of the nozzle according to the present invention, fine cladding powder is transported from a powder feeder to the nozzle inlet using a carrier gas (preferably argon). From the nozzle inlet the powder enters the flow-path system to form a plurality of streams of powder. Upon exit from the nozzle the powder is heated as it travels through the laser beam and is focused on the substrate which also is heated by the laser.

The powder is able to be transported through the flow-path system of the nozzle to achieve substantially identical streams of powder issuing from each outlet. The circumferentially extending passages or galleries allow balancing of powder flow should a partial blockage occur. Also, for balancing, it is desirable that the length of the passages of each set is not too short. This is because an unbalanced powder flow from a passage of one set to passages of the next set can occur if the passages of the one set are too short. The passages most preferably have a length which is at least three times their maximum width dimension. However, in at least some sets, the passages may have a substantially greater length. The passages of each set, and each circumferentially extending passage or gallery between sets should have a minimum cross-sectional dimension which is not less than three times the maximum particle size of the powder.

The powder streams issuing from the nozzle may form a combined stream. In any event, the streams converge to a focus which, in use, is on the workpiece. This is typically close to or slightly greater than the geometric focus for a laser beam issuing from the central passage, such as from −1 mm to +6 mm.

The powder streams issuing from the nozzle can be modified by forming a conical wedge-shaped groove around the second end of the nozzle. Such a groove is able to generate a converging conical curtain of powder flow, while avoiding any perpendicular edge exposed to reflected laser light. The wedge-shaped groove is able to reduce the overall velocity of the powder and make it more likely to be delivered into the melt pool. The groove can reduce local heating of the powder and the nozzle at the second end of the nozzle, and thereby avoid nozzle blockage with molten powder and damage of the nozzle itself. Also, the wedge-shaped groove is able to produce a more homogeneous (evenly distributed) flow of powder across the laser beam as it travels towards the melt pool, as the groove brings the initially separate powder streams closer together, such as to form a single focused conical peripheral curtain or sheet of powder. This results in a more clearly defined and focused, as well as better protected, gas and powder stream.

Where the outlets and the set of passages ending at the outlets are formed in the outer surface of the inner sleeve of the nozzle, the wedge-shaped groove can be formed by a bevel formed around an end margin of the inner sleeve. Where the outer surface of the inner sleeve tapers to the second end of the nozzle, the bevel is such as to result in the end margin having an increased angle of taper relative to the angle of taper of the main axial extent of that outer surface. The arrangement is such that, over the axial extent of the end margin, the outer surface of the inner sleeve diverges from the inner surface of the outer sleeve, to form an annular groove of V-shaped radial cross-section. The arrangement is such that the outlets are defined at the inner extent of the groove (that is, at the apex of the V-shape), with the passages of the set extending to the outlets thereafter decreasing in depth, such as to zero depth.

As will be well understood, it is necessary for an efficient cladding process for the focus of the powder to be within radius of the laser melt pool. However, there is no reason why cladding cannot be done either side of the laser focus as long as the appropriate laser spot diameter appears on the plate. The laser spot is governed solely by the distance between the focusing lens and the workpiece and the physical length of the nozzle has to be consistent with this unless the lens itself is able to be moved with respect to the powder focus.

The nozzle of the present invention is able to be compact, if required to facilitate application of the nozzle in restricted spaces. However, the nozzle also is suitable for being made on a large scale in order to be integrated into larger "mainstream" size laser cladding heads.

BRIEF DESCRIPTION OF THE DRAWINGS

In order that the invention may more readily be understood, description now is directed to the accompanying drawings, in which.

DETAILED DESCRIPTION OF THE DRAWINGS

Figure 1:
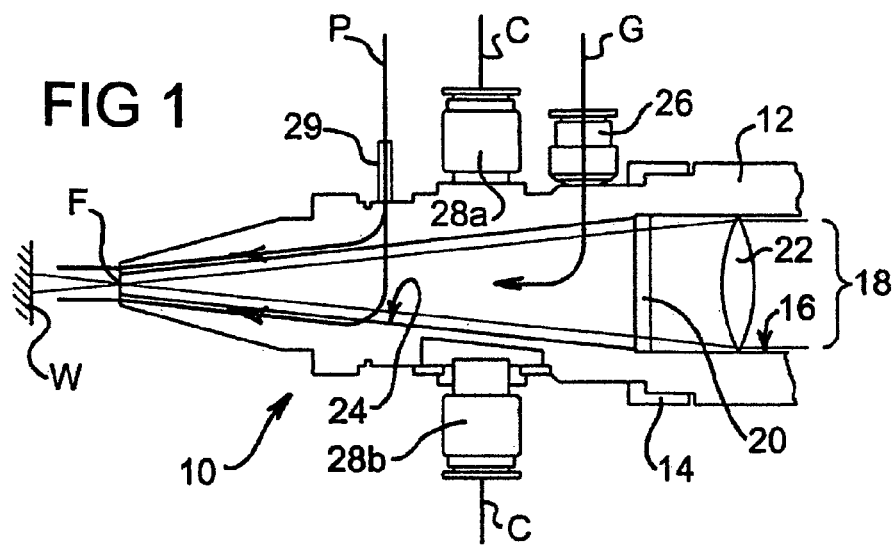
FIG. 1 schematically illustrates a nozzle according to the present invention as mounted on the outlet end of a laser delivery head.

With reference to FIG. 1, there is illustrated schematically a nozzle 10 according to the present invention. The nozzle 10 is shown mounted on the outlet end of a laser delivery head 12 in an arrangement suitable for laser cladding of a workpiece W. The schematic representation of FIG. 1 is for the purpose of describing the combination of nozzle 10 and laser head 12 in broad terms. The simplified version of FIG. 1 shows the nozzle 10 as a single overall unit secured to the outlet end of head 12 by a lock ring 14. However, head 10 preferably comprise an outlet part of an assembly which also includes a tubular main body, as described later herein. Such an assembly is desirable as it facilitates changing the outlet part as required for specific cladding applications.

The laser head 12 defines a bore 16 along which a laser beam 18 (the source of which is not shown) is able to issue. Adjacent to the outlet end of head 12, there is a window 20 through which the beam 18 passes. Inwardly from window 20, head 12 has a focus lens 22 by which beam 18 is able to be drawn to a focus at focal spot F, outwardly beyond the end of head 12. The nozzle 10 defines a central passage 24 through which the laser beam 18 passes. The passage 24 tapers similarly to beam 18, but with an annular clearance around beam 18. The focal spot F is a short distance beyond the end of nozzle 10 remote from head 12, enabling cladding of a surface of the workpiece W at, or close to, focus spot F. It is usual practice to clad past the focus spot F, but cladding can be conducted at, or before, focus spot F.

The arrangement of FIG. 1 shows connectors 26, 28a, 28b and 29. The connector 26 communicates with passage 24 and is connectable to a supply of shielding gas for flow of that gas along passage 24 towards workpiece W as depicted by arrow G. The shielding gas is to protect against oxidation of molten metal generated during cladding and, depending on the gas, it can inhibit formation of plasma adjacent the surface of workpiece W and disperse plasma that does form. Helium is the preferred shielding gas for these purposes, although argon generally is used because of its lower cost. Connectors 28a and 28b respectively allow the flow of coolant, usually water, through a coolant jacket around passage 24. The flow of coolant, depicted by arrow C, is for cooling nozzle 10. Connector 29 enables the supply, from a suitable source, of fine metal alloy cladding powder entrained in a carrier gas. The powder flows within nozzle 10, outwardly with respect to passage 24, as depicted by arrows P, prior to issuing from nozzle 10 around the laser beam 18.

The cladding powder is of a composition suitable for cladding required on workpiece W. The powder composition may be substantially the same as that of workpiece W if the cladding is to rebuild a worn part, or of a different composition if the cladding is to provide different characteristics, such as wear resistance, to workpiece W. The carrier gas preferably is the same as the shielding gas and, in any event, it should supplement rather than negate the purposes for the shielding gas.

In the cladding of workpiece W, laser beam 18 melts the powder issuing from nozzle 10 and also the surface of workpiece W. The two molten materials combine to form a coating on solidifying, to provide a clad layer built-up on workpiece W.

In known arrangements, a tapered chamber of annular cross-section is provided to enable the flow of powder along nozzle 10. However, rather than having such a chamber, nozzle 10 defines a flow-path system having a multi-branched, longitudinally extending arrangement of passages, extending from an inlet adjacent to connector 29 to a plurality of outlets around the passage 24 at the outlet end of nozzle 10. That system is illustrated later herein with reference to FIGS. 2 to 12.

Figure 2:
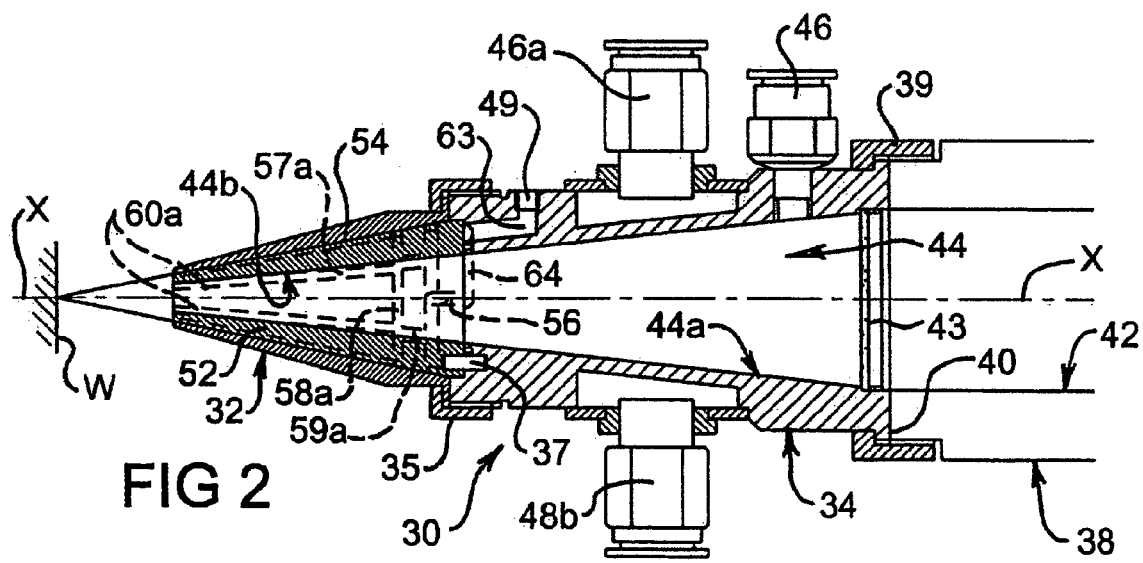
FIG. 2 shows, in an axial section, a first embodiment of a nozzle according to the invention.
Figure 3:
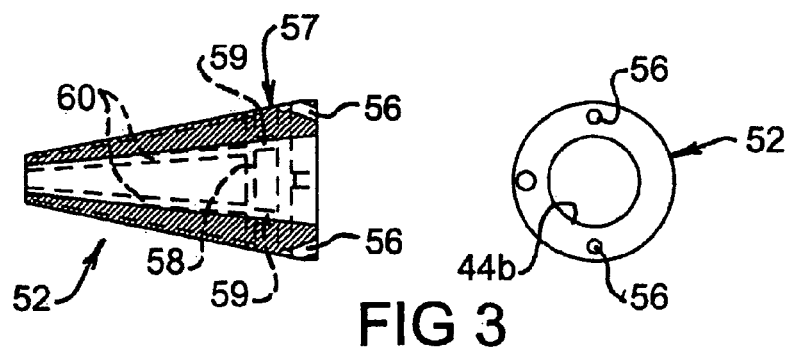
FIGS. 3 and 4 show sectional view of components of the nozzle of FIG. 2.
Figure 4:
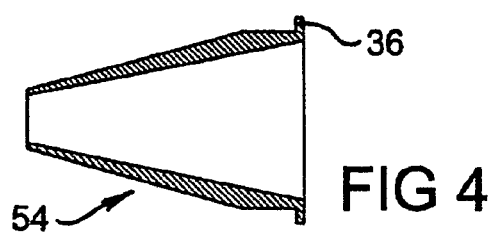

In FIG. 2, there is shown a nozzle 32 according to the present invention. Components of nozzle 10 are shown in FIGS. 3 and 4. However, in FIG. 2, nozzle 32 is shown as part of a nozzle assembly 30 which also includes a tubular main body 34. The nozzle 32 and body 34 of assembly 30 are secured together, in end to end relationship, by a lock ring 35 which is threaded onto body 34 to secure against body 34 a peripheral flange 36 (see FIG. 4) defined by the adjacent, first end of nozzle 32. A dowel pin 37 between nozzle 32 and body 34 ensures they are correctly angularly aligned. The assembly 30 is shown as mounted on the outlet end of a laser delivery head 38 by means of a further lock ring 39 threaded on head 38 and securing a peripheral flange 40 defined by body 34 against laser head 38.

The laser delivery head 38 defines a bore 42 from which a laser beam (not depicted) is able to issue to pass through assembly 30. At the end of head 38, there is a window 43 through which the beam passes. Also, upstream from window 43, head 38 has a focus lens (not shown) which brings the laser beam to a focus a short distance beyond the remote, second end of nozzle 32. From head 38, the focused laser beam passes through a tapered central passage 44 defined by assembly 30, with respective parts 44a and 44b of passage 44 defined by body 34 and head 32.

Assembly 30 has connectors 46, 48a, 48b and 49 which correspond to connectors 26, 28a, 28b and 29, respectively, of nozzle 10 of FIG. 1. Thus, connector 46 enables shielding gas to be received from a supply (not shown) for flow along central passage 44 prior to issuing from the second end of nozzle 32 towards a workpiece W. Connectors 48a and 48b enable coolant, such as water, to flow through a coolant jacket 50 defined by main body 34. The coolant cools body 34 to thereby draw thermal energy from, and cool, nozzle 32. The connector 49 enables fine metal alloy cladding powder entrained in a carrier gas to be supplied to and flow along nozzle 32, outwardly of part 44b of central passage 44, prior to the powder issuing from the second end of nozzle 32.

The nozzle 32 has an inner sleeve 52 shown in FIG. 3 and an outer sleeve 54 shown in FIG. 4. Each of sleeves 52 and 54, like body 34, is of annular cross-sections perpendicular to longitudinal axis X-X through assembly 30 and laser head 38. Each of sleeves 52 and 54 has a frusto-conical form which tapers from flange 36 at the first end of nozzle 32 to the second end. The sleeves 52 and 54 decrease in wall thickness to the second end. Also, the outer surface of sleeve 52 and the inner surface of sleeve 54 taper at substantially the same included angle such that, with nozzle 32 secured on body 34, those surfaces are in firm contact.

The nozzle 32 defines a flow-path system along which fine metal alloy cladding powder received via connector 49 is able to flow to, and issue from, the second end of nozzle 32. The flow-path system has a multi-branched longitudinally extending arrangement of passages from or adjacent to the first end of nozzle 32 to a plurality of outlets spaced around part 44b of passage 44 at the second end of nozzle 32. In the arrangement of FIGS. 2 to 4, the passages are defined by the inner surface of outer sleeve 54 and by grooves formed in the opposed outer surface of inner sleeve 52.

The nozzle 32 has two diametrically opposite inlets 56. Each of the inlets 56 comprises a short passage extending from an end face of sleeve 52, at the first end of nozzle 32, obliquely outwardly to the outer surface of sleeve 52. As shown in FIG. 3, the outer ends of the inlets 56 terminate at a first circumferential groove 57 formed in the outer surface of sleeve 52. A short distance from groove 57, a second circumferential groove 58 is formed in the outer surface of sleeve 52. Between grooves 57 and 58, two pairs of longitudinal grooves 59 are formed in sleeve 52, with a groove 59 of each pair angularly spread by about 45° to a respective side of a respective inlet 56. From groove 58 and the second end of nozzle, there are four pairs of longitudinal grooves 60, with each groove 60 of each pair angularly spread by about 22.5° to a respective side of a respective one of grooves 59. The grooves 59 and 60 preferably are in respective planes containing the axis X-X.

The grooves 57, 58, 59 and 60 in the outer surface of inner sleeve 52 are covered by the inner surface of outer sleeve 54. Thus the inner surface and each of grooves 57 to 60 defines a corresponding passage shown in FIG. 2 as passages 57a, 58a, 59a and 60a. Each passage 60a ends at a respective outlet 62 at the second end of nozzle 32. As will be appreciated from the angular disposition of the four pairs of grooves 60 and, hence passages 60a, the eight outlets of 62 are uniformly spaced around central passage 44 at the second end of nozzle 32.

Alloy powder entrained in a carrier gas which is supplied via connector 49 passes axially along a passage 63 in body 34 to an arcuate passage 64 defined by a groove in the end face of body 34 against which nozzle 32 is secured, and by the adjacent end face of nozzle 32. The passage 64 extends circumferentially through about 180° such that, at each of its ends, passage 64 communicates with a respective inlet 56 at the first end of nozzle 32. Thus, from passage 64, the gas entrained powder is able to flow through the flow-path system comprising passages 57a, 58a, 59a and 60a of nozzle 32, ultimately to issue from outlets 62. In its flow through that system, the powder enters each inlet 62 and splits to flow circumferentially in opposite directions in passage 57a to each passage of the pair of passages 59a for each inlet 62. The powder then flows longitudinally in each of the four passages 59a to enter passage 58a. From each passage 59a the powder splits to flow circumferentially in opposite directions in passage 58a to each passage of the pair of passages 60a for each passage 59a. The powder then flows longitudinally in each of the eight passages 60a, and issues as a respective stream from each outlet 62. The streams tend to spread in flow away from the outlets 62 and, due to this and the relatively close angular spacing between outlets 62, the streams substantially form an annular curtain of powder around axis X-X. However, due to the taper of nozzle 32 and, hence, the convergence of passages 60a, the streams converge to a focus shown at F in FIG. 2.

Figure 5:
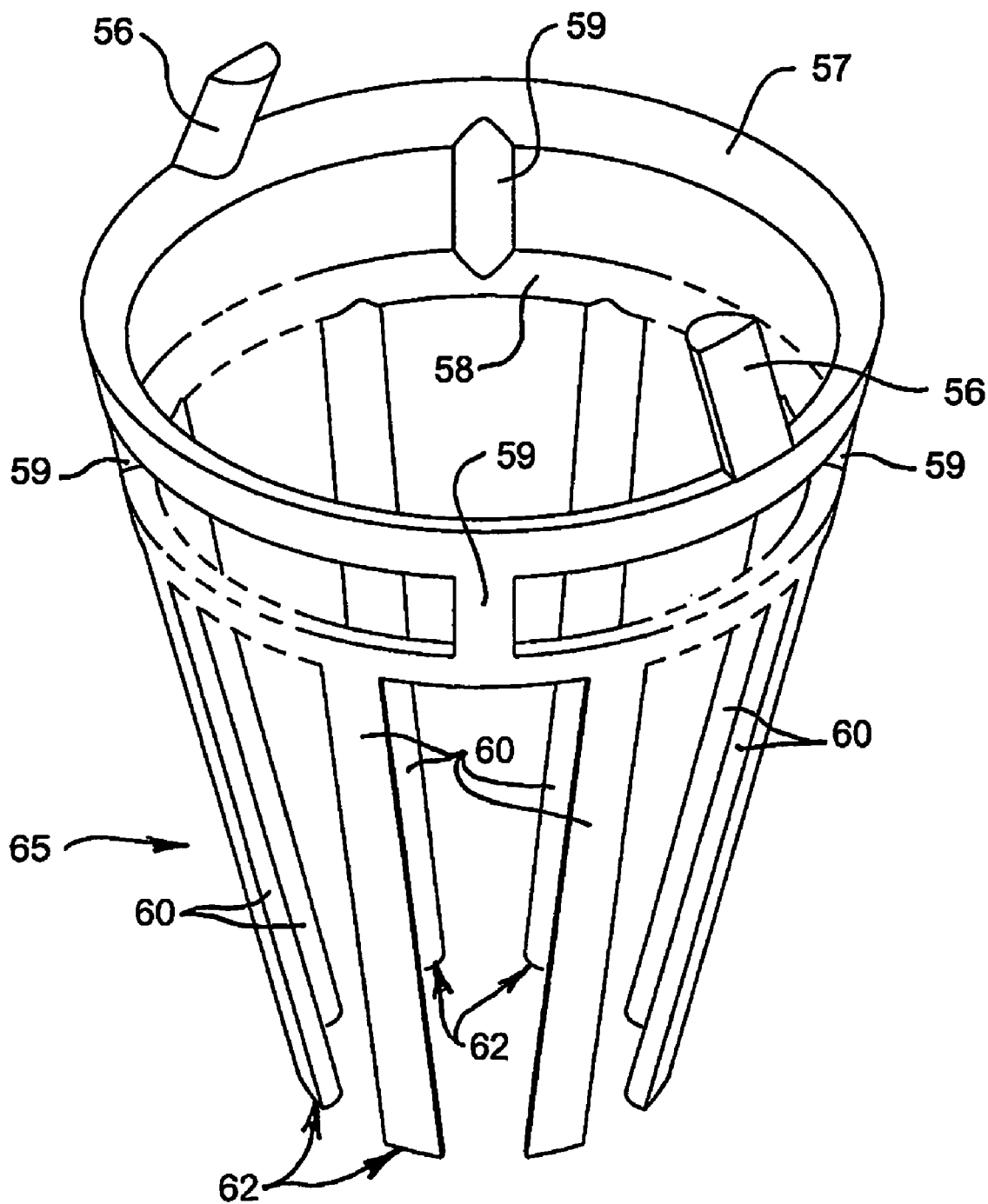
FIG. 5 is a schematic illustration of a flow-path defined between the components of the nozzle of FIG. 2.

FIG. 5 illustrates the form of the flow system of the nozzle 32 of FIG. 2. The system 65 is shown as if powder has consolidated therein, and the inner and outer sleeves then have been removed. However, the parts of the flow system 65 have the same reference numerals as used in relation to FIGS. 2 to 4.

The flow system 65 shown in FIG. 5 comprises a branched, longitudinally extending arrangement of passages which extends from an inlet to a plurality of outlets. The system 65 in fact has two inlet passages 56. Fine metal alloy powder entrained in a carrier gas is able to pass to the inlet passages 56 from a source of supply. As shown in broken outline, the supply is via connector 49, along passage 63 and around arcuate passage 64, each defined in body 34. The system 65 further includes first and second longitudinally spaced circumferential grooves 57 and 58, with each inlet 56 communicating with groove 57 at diametrically opposite locations. The groove 57 is in communication with groove 58 by a first set of four longitudinally extending grooves 59 which are spaced circumferentially at 90° intervals from each other. From groove 58, a second set of eight longitudinally extending grooves 60 lead to eight outlets 62. The grooves 60 are uniformly spaced at 45° intervals from each other, and are offset at 22.5° intervals from the grooves 59 of the first set.

As shown in FIGS. 2 to 4, the inlet passages 56 extend obliquely through inner sleeve 52, from the first end to the outer surface of sleeve 52. The grooves 57, 58, 59 and 60 are formed in the outer surface of sleeve 52. The grooves 57 to 60 are U-shape in cross-section and, when covered by outer sleeve 54, provide passages of D-shaped cross-section. As previously indicated, the passages 56 and passages provided by grooves 57 to 60 each have a minimum cross-sectional dimension which is not less than three times the maximum particle size of the powder to pass therethrough. The same minimum cross-sectional dimension also applies to the powder supply path upstream from passages 56, including connector 49 and passages 63 and 64.

With the flow of powder through the flow system 65 shown in FIG. 5, powder flows from each of the two inlet passage 56 into first circumferential groove 57. In groove 57, the powder flows in opposite circumferential directions from each passage 56, to substantially fill groove 57 around its full circumferential extent. From groove 57, the powder flows into and along each of grooves 59 of the first set of four, to the second circumferential groove 58. Again, the flow in groove 58 is in opposite circumferential directions from each groove 59, to substantially fill groove 58. From groove 58, the powder flows into and along each of grooves 60 of the second set of eight, to discharge from the respective outlet 62.

While grooves 57 and 58 are circumferentially continuous and are substantially fully filled with powder, as is preferred, sections of each groove 57 and 58 is shown in broken outline. This is to highlight the dominant powder flow paths for circumferentially continuous grooves, and also to represent an alternative arrangement in which grooves 57 and 58 are circumferentially discontinuous. Thus, with the circumferentially continuous grooves 57 and 58, each of passages 56 opens to groove 57 mid-way between the opening to a respective pair of grooves 59. The dominant flow from each groove 56 is around groove 57 to each of the grooves 59 of the respective pair in substantially equal proportions. Similarly, each of grooves 59 opens to groove 58 mid-way between the opening to a respective pair of grooves 60. Thus, the dominant flow from each groove 59 is around groove 58 to each of grooves 60 of the respective pair, again in substantially equal proportions. Thus, while the sections of each of grooves 57 and 58 shown in broken outline will fill with powder, those sections contribute little to the dominant powder flow paths. Hence, in the alternative arrangement referred to above, the sections shown in broken outline can be omitted to provide circumferentially discontinous grooves 57 and 58.

Figure 6:
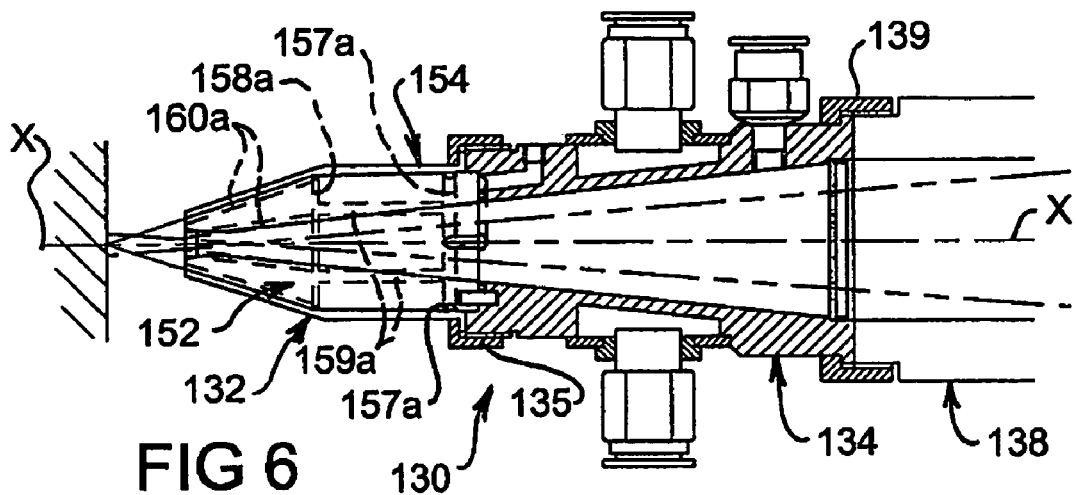
FIGS. 6 to 8 correspond to FIGS. 2 to 4, respectively, but show a second embodiment of a nozzle according to the invention.
Figure 7:
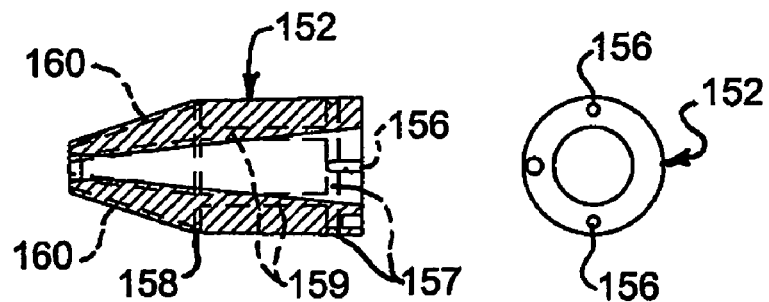
Figure 8:
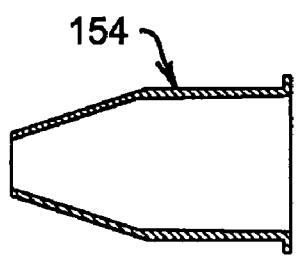

FIGS. 6 to 8 show a nozzle, an assembly and a laser delivery head according to a second embodiment. The arrangement of FIGS. 6 to 8 correspond in large part to that of FIGS. 2 to 4. Thus corresponding parts have the same reference plus 100, and description is limited to details in which the embodiment of FIGS. 6 to 8 differs from that of FIGS. 2 to 4.

In FIGS. 6 to 8, the nozzle 132 is shown as having a first part extending from its first end which is cylindrical, and a second part which tapers from the first part to the second end of nozzle 132. The same applies to each of the inner sleeve 152 and outer sleeve 154, while the tapered part of sleeve 154 does not decrease in wall thickness towards the second end. Also, the cylindrical part of nozzle 132 accounts for a little over half the length of nozzle 132 between its first and second ends, and groove 158 and, hence, passage 158a is at the junction of the cylindrical and tapered parts. Thus, groove 158 and passage 158a are spaced further from groove 157 and passage 157a, respectively than the corresponding features of FIGS. 2 to 4, while grooves 159 and passages 159a are not inclined with respect to axis X-X.

Nozzle 132 is mounted on main body 134 by a lock ring 135, to provide an assembly 130. Also, assembly 130 is mounted on laser delivery head 138 by lock ring 139. Apart from the differences noted for nozzle 132, assembly 130 and head 138 essentially are the same as the corresponding components shown in FIGS. 2 to 4. Also, the flow-path system comprising passages 157a, 158a, 159a and 160a function substantially as described for the system of FIGS. 2 to 4 in providing for the flow of alloy powder supplied to inlets 156 to the outlets 162.

Figure 9:
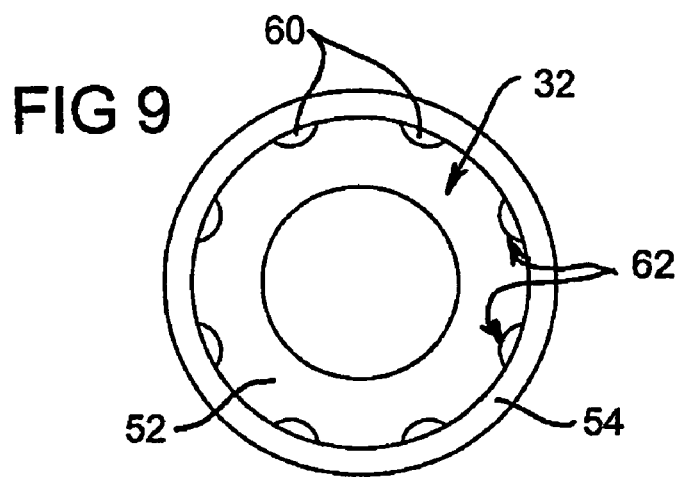
FIG. 9 is an end elevation of a nozzle according to the embodiment of FIGS. 2 to 4.

FIG. 9 shows the second end of a nozzle according to nozzle 32 of FIGS. 2 to 4 as viewed axially. The uniform angular array of outlets 62 is shown, as well as the respective annular end of sleeves 52 and 54. The outlets 62 show the cross-sectional form of grooves 60, and this can correspond to the form for grooves 57, 58 and 59. The grooves may, for example, range from about 0.4 to 1.5 mm deep and from about 1 to 2 mm wide for a nozzle 32 ranging from about 40 to 60 mm in length. However, the cross-sections can decrease from one groove to the next in the flow direction given the successive stages of splitting streams of powder.

Figure 10:
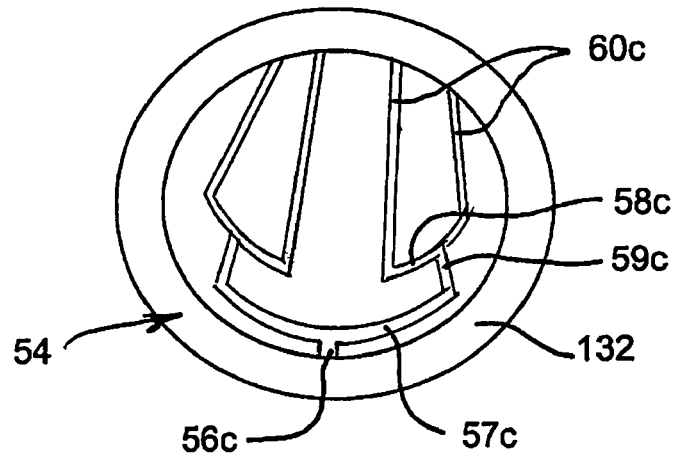
FIG. 10 is a perspective view of one component of the nozzle of FIG. 9, but viewed from the opposite end.

FIG. 10 shows the interior of the outer sleeve 54 of the nozzle 32 of FIGS. 2 to 4, as viewed from the first end at which flange 36 is defined. The inner surface of sleeve 54 shows powder traces resulting from abrasion of that surface of sleeve 54 due to the flow of alloy powder along the passages of the flow-path system. The traces are identified by the reference numerals for the inlet and respective grooves, plus the suffix "c". It is to be noted that grooves 57 and 58 are circumferentially continuous. Despite this, the powder flow in groove 57 is around only the parts of groove 57 between each groove 56 and a respective pair of grooves 59. Similarly, the powder flow in groove 58 is around only the parts of groove 58 between each groove 59 and a respective pair of grooves 60.

Figure 11:
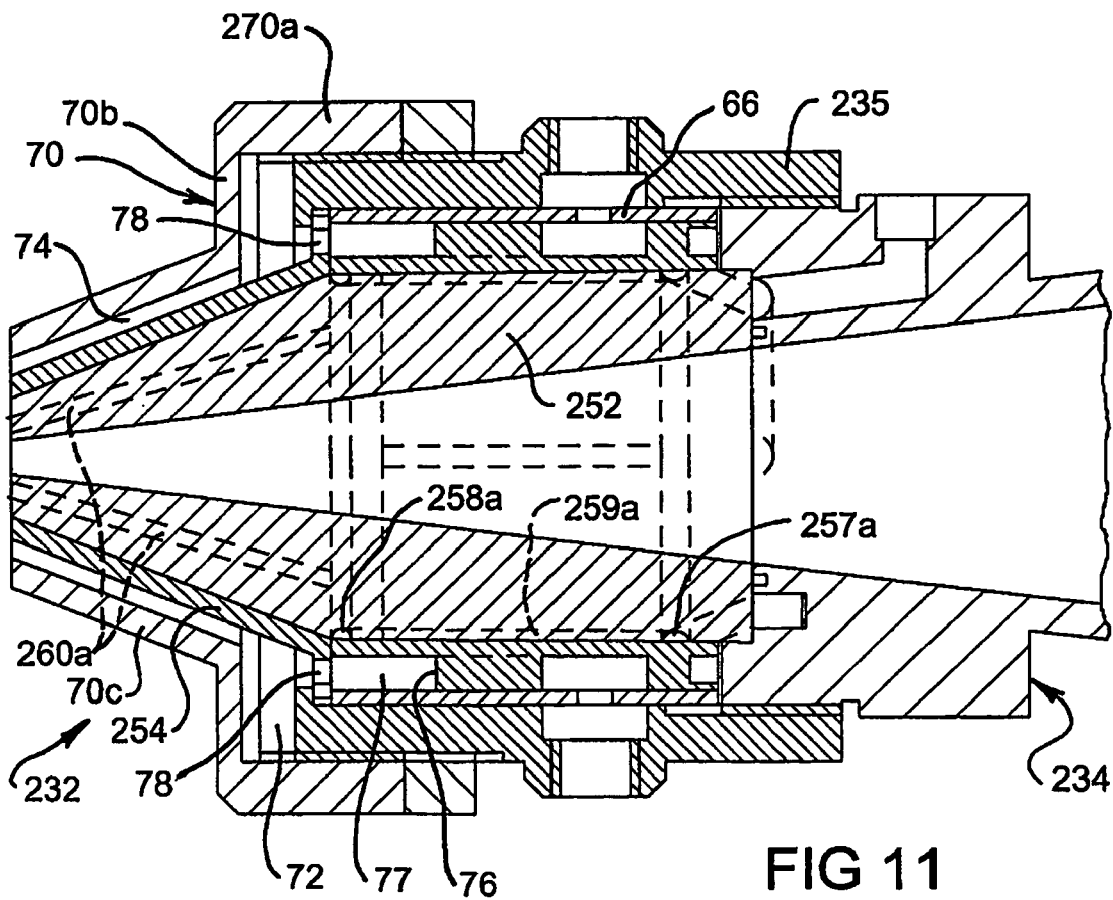
FIG. 11 corresponds to FIG. 6, but shows a third embodiment of a nozzle according to the invention.

FIG. 11 shows a nozzle which, in terms of its inner and outer sleeves, is substantially the same as nozzle 132 of FIGS. 6 to 8. Corresponding components therefore have the same reference numerals plus 100. Thus, nozzle 232 of FIG. 11, has inner and outer sleeves 252 and 254, respectively. Sleeve 252 defines grooves which, together with sleeve 254, form passages 257a and 258a each comprising a circumferential gallery, and also forming longitudinal passages 259a and 260a. Nozzle 232 is mounted on a main body 234 by a lock ring 235 to provide an assembly 230, with the assembly mountable on a laser delivery head (not shown) from which a laser beam is able to pass through assembly 230.

The lock ring 235 is of elongate form and concentric with the cylindrical first part of nozzle 232. The ring 235 clamps against a shoulder defined by sleeve 254 at the junction between the cylindrical and tapered parts of nozzle 232. Ring 235 retains a sealing sleeve 66 around the cylindrical part of nozzle 232.

The principal difference between nozzle 232 of FIG. 11 and nozzle 132 of FIGS. 6 to 8 is the provision of an outermost sleeve or casing 70. A cylindrical part 70a of sleeve 70 is threaded on to the end of ring 235 nearer to the outlet end of nozzle 232. Beyond the end of ring 235, sleeve 70 has a radially inwardly extending flange 70b and, extending from the inner periphery of flange 70b, sleeve 70 has a frusto-conical part 70c which tapers to the second end of nozzle 232. With outer sleeve 254, nozzle 70 defines an annular chamber 72 between flange 70b and the adjacent end of ring 232 and, extending from chamber 72, a frusto-conical annular clearance 74 which opens at the outlet or second end of nozzle 232.

The sealing sleeve 66 covers a channel 76 cut around the outer periphery of sleeve 254, to define an annular chamber 77. A supply of shielding gas (also preferably argon) is able to be supplied to chamber 77 from an inlet port (not shown). From chamber 77, the gas is able to pass through ports 78 defined in sleeve 254, and to flow around chamber 72 and along clearance 74.

As with gas issuing from central passage 224, and carrier gas issuing from the outlet ends of passages 260a, the gas issuing from clearance 74 is able to protect heated powder and molten metal from atmospheric oxygen. However, in each case, the gas has further important functions. In the case of gas issuing from clearance 74, a further purpose is to enhance the form and integrity of the flow of powder from nozzle 232. Without gas issuing from clearance 74, the flow of powder will be exposed to and impinge on the surrounding atmosphere, with resultant shear causing the development of eddy currents and turbulence which degrade the form and integrity of the flow of powder. By suitably matching the flow velocities of the powder and gas issuing around the powder from clearance 74, eddy currents and turbulence can be substantially reduced or effectively eliminated. Thus a substantially more laminar powder flow is able to be achieved.

Figure 12:
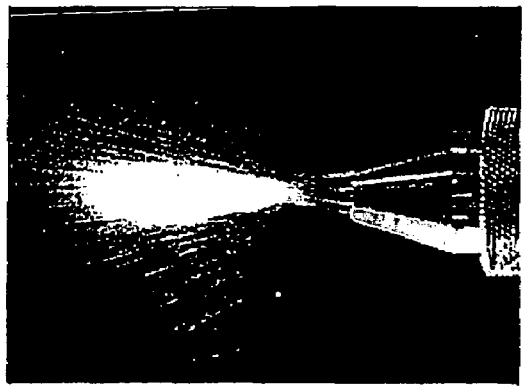
FIG. 12 shows a nozzle according to FIGS. 6 to 8 in use.

FIG. 12 shows powder issuing from a nozzle corresponding to nozzle 132 shown in FIGS. 6 to 11. The nozzle is shown in a horizontal disposition and, despite issuing horizontally, the powder flow can be seen to be resisting the influence of gravity over the substantial distance illustrated. The nozzle is able to generate comparable powder flow in any orientation, including vertically up. The nozzle is shown as generating a respective stream of powder from the outlet end of each flow passage. However, a short distance from the outlet end of the nozzle, the streams can be seen to merge as they converge towards a focus, to provide an annular curtain of powder flow.

Figure 13:
FIG. 13 shows the nozzle of FIG. 12 in use, but after modification.
Figure 14:
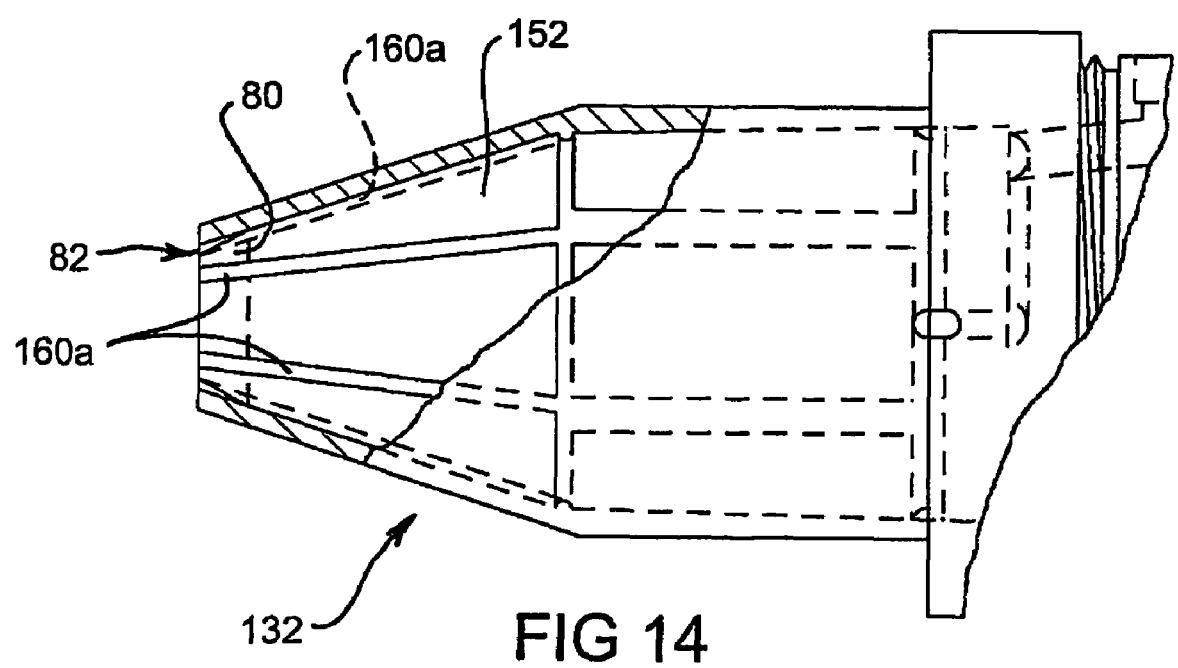
FIG. 14 shows a nozzle as in FIGS. 6 to 8 with the modification used in the nozzle of FIG. 13.

The nozzle used for the illustration of FIG. 12 first was modified and then used in trials illustrated in FIG. 13 to assess the form of powder flow under two slightly different conditions. The modification is illustrated in FIG. 14 which shows the outlet end portion of the nozzle, on an enlarged scale. As the nozzle of FIG. 12 (that is, the nozzle of FIG. 13 prior to modification) corresponds to nozzle 132 of FIGS. 6 to 8, the nozzle of FIG. 14 has the same reference numerals as used in FIGS. 6 to 8.

In FIG. 14, the inner sleeve 152 of nozzle 132 has a cylindrical first part extending from its first end, and a second part which tapers from the first part to the second end. However, in contrast to the constant taper of FIGS. 6 to 8, the tapered part has two frusto-conical sections due to a terminal portion 80 tapering at an increased cone angle than the main part. The taper of portion 80 is such that the depth of passages 160a progressively reduces along portion 80, effectively to zero depth at the second end of the nozzle. However, the outer sleeve 154 has the same taper throughout. As a consequence, sleeves 154 and portion 80 of sleeve 152 define an annular clearance 82 therebetween. Clearance 80 is wedge-shaped in radial cross-sections and increases in its radial width to a maximum at the second end of the nozzle.

Reverting to FIG. 13, the two illustrations of the nozzle, modified as in FIG. 14, show the powder stream as comprising a cohesive, substantially uniform annular or curtain flow. This is in contrast to the separate streams evident in FIG. 12 as the powder issues from the second end of the nozzle. In addition to providing this improved powder flow, the double taper of sleeve 152 facilitates assembly and disassembly of nozzle 132. FIG. 13, in each illustration, shows the nozzle oriented vertically down, although the form of the stream is able to be retained in all orientations.

The difference in conditions for the two illustrations of FIG. 13 is in the flow velocity of gas supplied along the central passage along which a laser beam is able to pass. The nozzle illustration on the right of FIG. 13 was obtained with use of a higher gas flow velocity along the central passage than was used for the nozzle illustration on the left. As will be noted, the focus of the gas stream is moved further beyond the second end of the nozzle with the higher gas flow velocity. It is found that control of the gas flow velocity along the central passage is of assistance in fine tuning the position of the focus of the powder stream relative to the position of the focus of the laser beam.

A number of variants are possible in the nozzle of the present invention. Thus, the outermost sleeve or casing 70 shown in FIG. 11 can be adapted for use with the nozzle 32 of FIGS. 2 to 4. Also, that nozzle 32 of FIGS. 2 to 4, as well as the nozzle of FIG. 11, can be modified in the manner described with reference to FIG. 14 to have a more sharply tapered terminal portion.

Where a more sharply tapered terminal portion is provided, such as in a modified form of nozzle 32 of FIGS. 2 to 4 or for nozzle 132 of FIGS. 6 to 8, the taper may be as shown for portion 80 in FIG. 14. That is, over the length of the more sharply tapered terminal portion, the depth of grooves in the inner sleeve may reduce to zero depth at the second end of the nozzle. However, in a variant of this, the grooves may reduce to zero depth a short distance upstream from the second end of the nozzle. This is found to be particularly beneficial in minimising sharp edges at that end, thereby reducing heat build up. Thus, the risk of powder adhering to the nozzle at the second end is reduced, with consequential reduction in the likelihood of the nozzle becoming clogged.

The nozzle of the invention enables the provision of cladding without the need for a workpiece surface to be horizontal. That is, the ability of the nozzle to operate at any required orientation very substantially increases the freedom to carry out a cladding process. When this is combined with the ability of the nozzle to be very small in size without sacrificing the ease of operation at required orientations, and the ability to be used with suitable laser technology such as Nd:YAG and diode laser technology, it can be practical in many instances to conduct a cladding operation in situ. By way of example, a major problem for power station operators is the cost of replacement or repair of damaged LP turbine blades. The blades themselves are very expensive, as also is the downtime for their replacement or repair. Conventionally, the blades have to be removed for repair, while the nozzle of the present invention can enable on-site, in-situ repair with the downtime reduced to that necessary for the repair. The potential for cost saving is very substantial, and it results from a lower cost per blade and a reduction in downtime.

Finally, it is to be understood that various alterations, modifications and/or additions may be introduced into the constructions and arrangements of parts previously described without departing from the spirit or ambit of the invention.

The invention claimed is:

1. A powder delivery nozzle for a laser cladding delivery head, wherein the nozzle includes an inner sleeve disposed within an outer sleeve and having an outer surface in contact with an inner surface of the outer sleeve; wherein the inner sleeve defines a central passage which extends from a first end to a second end of the nozzle and which enables a laser beam to pass along an axis through the nozzle, from the first end; the sleeves, along their contacting surfaces, co-operate to define a flow-path system along which fine metal alloy powder is able to pass for discharge at the second end of the nozzle; the nozzle, at a location remote from the second end, has an inlet through which the fine powder entrained in a carrier gas is able to be supplied to the flow-path system for flow to, and discharge at, the second end of the nozzle; the flow-path system has a multi-branched longitudinally extending arrangement of passages extending from the inlet to a plurality of outlets spaced around the central passage at or adjacent to the second end of the nozzle; and wherein the arrangement of passages includes a first set of passages each of which extends longitudinally from the inlet towards the second end of the nozzle and a second set of passages each of which extends longitudinally from the first set towards the second end of the nozzle, with the passages of the first set angularly offset from the passages of the second set and each passage of the first set in communication with two passages of the second set by a circumferentially extending passage or gallery such that powder flow from each passage of the first set is able to pass through to two passages of the second set.

2. The nozzle of claim 1, wherein each passage of the second set extends to a respective one of the plurality of outlets of the nozzle.

3. The nozzle of claim 1, wherein there is a third set of passages which extend from the second set with each passage of the second set in communication with two passages of the third set by a circumferentially extending passage or gallery, there optionally being a fourth set of passages which extend from the third set with each passage of the third set in communication with two passages of the fourth set, and wherein each passage of the third set or, if provided, each passage of the fourth set, extends to a respective one of the plurality of outlets of the nozzle.

4. The nozzle of claim 2, wherein the plurality of outlets is substantially uniformly distributed around the axis of the nozzle, while at least the passages of the set extending to the outlet are distributed around the axis of the nozzle.

5. The nozzle of claim 1, wherein the passages of successive sets of passages are in communication through a circumferentially continuous passage or gallery.

6. The nozzle of claim 1, wherein the passages of successive sets of passages are in communication through a circumferentially discontinuous series of passages or galleries.

7. The nozzle of claim 1, wherein each passage of each set extends substantially parallel to a respective plane containing the axis of the nozzle and communicates with two passages of the next set by a passage or gallery that extends circumferentially and parallel to a plane perpendicular to the axis of the nozzle.

8. The nozzle of claim 1, wherein the nozzle is adapted at its first end for connection to a laser delivery head from which a laser beam is able to pass along the central passage and for the supply of shielding gas for flow along the central passage.

9. The nozzle of claim 1, wherein the nozzle is releasably connected at its first end to an end of a tubular main body to form a nozzle assembly, with the main body at its other end being releasably connectable to a laser delivery head from which a laser beam is able to pass through a central passage of the main body and the central passage of the nozzle.

10. The nozzle of claim 9, wherein the main body defines a water jacket through which cooling water is able to flow for cooling the nozzle, and wherein the main body has a connector through which shielding gas can pass from a supply to the central passage of the main body, and a connector through which fine metal alloy powder entrained in a carrier gas is able to pass from a supply for flow through the flow-path system of the nozzle.

11. The nozzle of claim 1, wherein the nozzle has from four up to about thirty-two outlets.

12. The nozzle of claim 1, wherein there are four passages in the first set and eight passages in the second set.

13. The nozzle of claim 1, wherein the outer surface of the inner sleeve and the inner surface of the outer sleeve taper to the second end of the nozzle, over at least part of the axial extent of those surfaces ending at the second end.

14. The nozzle of claim 13, wherein the outer surface of the inner sleeve and the inner surface of the outer sleeve are cylindrical over a first part of their axial extent from adjacent to the first end of the nozzle and thereafter the surfaces taper frusto-conically to the second end of the nozzle.

15. The nozzle of claim 13, wherein the outer surface of the outer sleeve follows the overall form of the inner surface of the outer sleeve.

16. The nozzle of claim 1, wherein the surfaces of the sleeves are circular in cross-sections normal to the axis of the nozzle.

17. The nozzle of any claim 1, wherein the flow-path system is defined by grooves formed in the outer surface of the inner sleeve in combination with the inner surface of the outer sleeve.

* * * * *